No. 755,823. PATENTED MAR. 29, 1904.
R. B. WILLIAMSON.
SPRAYING DEVICE.
APPLICATION FILED SEPT. 19, 1903.
NO MODEL.
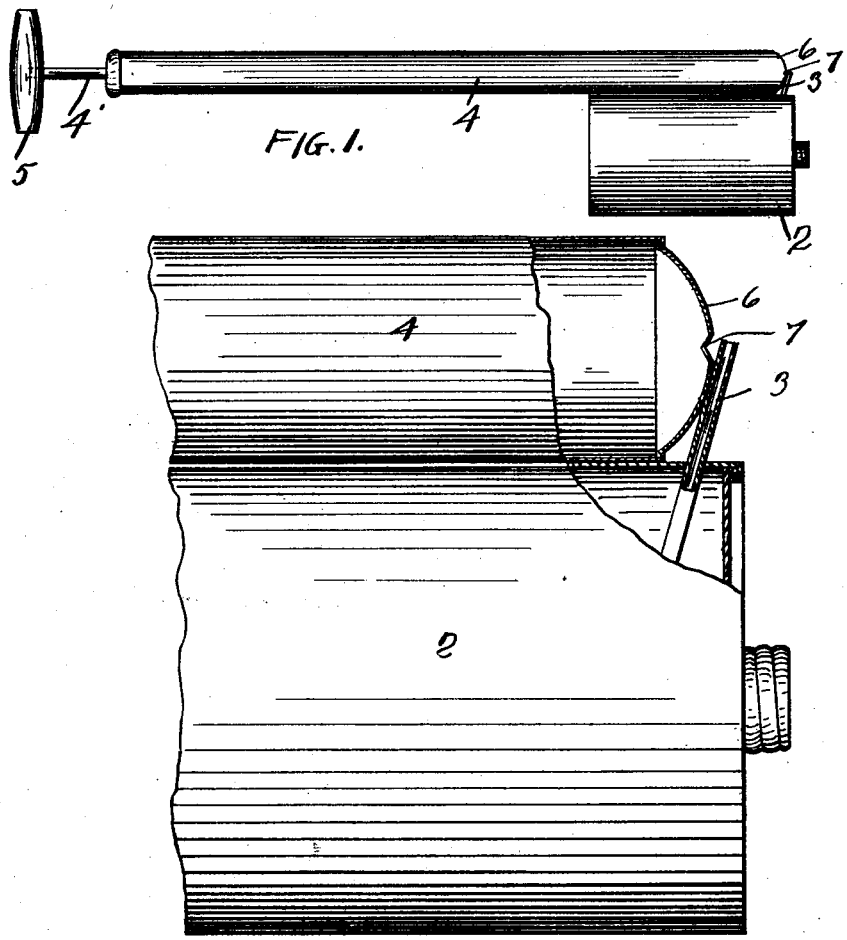
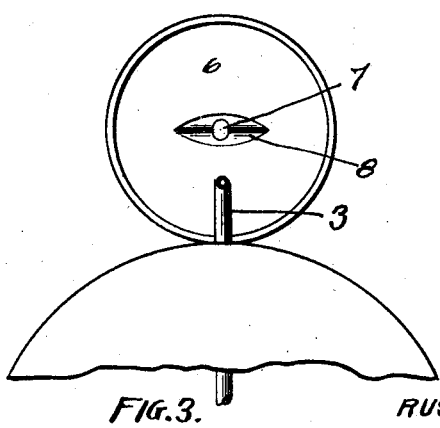
WITNESSES
INVENTOR
RUSSELL B. WILLIAMSON
BY
HIS ATTORNEYS.

No. 755,823. Patented March 29, 1904.

UNITED STATES PATENT OFFICE.

RUSSELL B. WILLIAMSON, OF CLIFTON SPRINGS, NEW YORK.

SPRAYING DEVICE.

SPECIFICATION forming part of Letters Patent No. 755,823, dated March 29, 1904.

Application filed September 19, 1903. Serial No. 173,810. (No model.)

*To all whom it may concern:*

Be it known that I, RUSSELL B. WILLIAMSON, of Clifton Springs, county of Ontario, State of New York, have invented certain new and useful Improvements in Spraying Devices, of which the following is a specification.

The object of my invention is to provide the pump-barrel of a spraying device with a nozzle that will cause the spray to assume a fan-like form as it is discharged from the apparatus to the end that the device may be more effective and the operator able to cover a greater area in a given length of time.

The invention consists generally in various constructions and combinations, all as hereinafter described, and particularly pointed out in the claims.

In the accompanying drawings, forming part of this specification, Figure 1 is a side elevation of a spraying device embodying my invention. Fig. 2 is a detail of the same, showing the peculiar form of nozzle employed. Fig. 3 is an end view of the device looking at the front of the nozzle.

In the drawings, 2 represents a barrel or reservoir wherein the liquid to be sprayed is placed, provided with a tube 3, that projects above the top of the barrel.

4 is a pump barrel or cylinder secured to the barrel 2 at its forward end and having a piston (not shown) and an operating-rod 4, provided with the usual handle 5. The forward end of the cylinder 4 is provided with a convex wall 6, having a centrally-arranged orifice 7 therein that is preferably oval and opposite the upper end of the tube 3, the greatest diameter of said orifice being in line substantially with said tube, as shown in Fig. 3. Surrounding this orifice I provide a horizontal oval depression 8, extending upon each side of the orifice, so that when the air is discharged by the movement of the pump-piston it will pass along the depression upon each side of the tube 3 and spread the spray discharged from said tube in a fan-like form that will greatly increase the efficiency of the device.

I am aware that spraying devices with liquid-reservoirs and air-pumps and atomizing-tubes have been patented heretofore and are now in general use, and hence I make no claim, broadly, to the same herein, my invention consisting in providing a horizontally-arranged depression in the forward end of the pump-barrel which will serve to direct the air out to the sides of the atomizing-tube and spread the spray as it is discharged therefrom.

I claim as my invention—

1. The combination, with a reservoir and a tube leading therefrom, of a pump having its forward end provided with an orifice opposite the open end of said tube, and a depression extending laterally with respect to said orifice.

2. The combination, with a reservoir and a tube leading therefrom, of a pump having an oval orifice in its forward end near the open end of said tube, and a depression extending laterally upon each side of said orifice, for the purpose specified.

3. In a spraying device, the combination with an air-pump having a discharge-orifice in one end and an elongated transverse depression inclosing said orifice, a reservoir suspended below the discharge end of said air-pump and a tube leading from said reservoir to a point opposite said orifice.

In witness whereof I have hereunto set my hand this 14th day of September, 1903.

RUSSELL B. WILLIAMSON.

In presence of—
CHAS. SCHULTZ,
BURT BALDWIN.